United States Patent

[11] 3,625,132

| [72] | Inventor | Peter B. Smith |
| | | Monroe, Conn. |
| [21] | Appl. No. | 887,958 |
| [22] | Filed | Dec. 24, 1969 |
| [45] | Patented | Dec. 7, 1971 |
| [73] | Assignee | Dynamics Corporation of America |
| | | New York, N.Y. |

[54] VEHICLE COMPARTMENT VENTILATOR
7 Claims, 5 Drawing Figs.

| [52] | U.S. Cl. | 98/2 A |
| [51] | Int. Cl. | B60h 1/24 |
| [50] | Field of Search | 98/2, 2.1 |

[56] References Cited
UNITED STATES PATENTS

| 2,443,454 | 6/1948 | Hennessy | 98/2.1 |
| 3,358,576 | 12/1967 | Kelly | 98/2 |

Primary Examiner—Meyer Perlin
Attorney—Richard P. Schulze

ABSTRACT: A ventilator for providing ventilation to the interior compartments of vehicles which will pass air in either direction therethrough. A cover on one side of an aperture is connected to a pair of C-shaped rods which pass through the aperture. Each rod is connected to a pair of arms pivotally attached to a brace extending on the opposite side of the aperture from the cover. Spring means bias the rods so as to maintain the cover in either a closed or open condition.

PATENTED DEC 7 1971 3,625,132

INVENTOR
PETER B. SMITH

VEHICLE COMPARTMENT VENTILATOR

The invention relates generally to ventilators, and more specifically to ventilators which are used to provide ventilation to the interior compartments of vehicles.

Vehicles, and particularly automobiles and trucks, require a system for providing ventilation of the body compartment by means of airflow into and/or out of the compartment.

Many types of ventilating apparatus are available for such purposes, some of which are hinged and some of which are spring-biasing means. Most of these ventilators are designed for a single purpose. That is, they either provide a means for forcing air into the compartment or are so designed as to direct air out of the compartment.

Some ventilators are available which provide both of the above-described function. These devices use a cover for the closure which does not have standard hinges and, therefore, can be opened at an angle in either of two directions. Those of which I am familiar have a number of drawbacks. Some have complicated mechanisms which add to the cost thereof and inherently are susceptible to breakage of the many individual parts. Others are large and bulky and require excessive room within the interior of the compartment. Still others are difficult to operate due to the fact that they depend upon frictional contact to maintain the cover in a selected position.

An object of the present invention is to provide an improved ventilator for a vehicle which is capable of passing air in either of two directions.

Another object of the invention is to provide an improved ventilator for a vehicle which is capable of passing air in either of two directions and which is spring-biased in either of its two opened positions as well as in its closed position.

These and other objects of the invention will be more clearly understood from the following description taken together with the drawings wherein.

Figure 3:
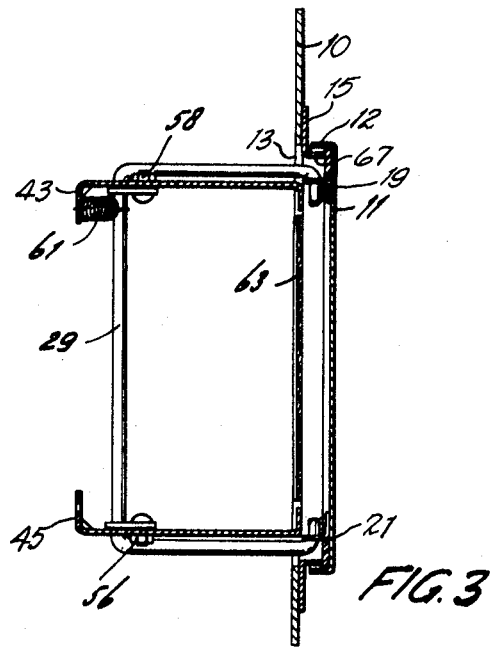
FIG. 3 is a sectional view taken along the lines 3—3 of FIG. 2.

Turning now to a detailed description of the specific ventilator shown in the drawings, a cover 11 is shaped so as to mate with the particular aperture 13 in a wall or panel of a vehicle (not shown) or other structure as shown in fragmentary section at 10 in FIG. 3. Preferably the cover is provided with a rim 12 extending toward the aperture.

In order to provide for mass production of the ventilator, it may be mounted on a plate 15 having an opening therein and also having boreholes 17 for mounting the entire assembly over the aperture in the wall of the vehicle.

A pair of L-braces 19 and 21 may be secured to the inside face of cover 11 at either end thereof by any well-known means such as welding. These braces are also provided with boreholes such as indicated at 23 and 25 at the outer ends thereof.

A pair of C-shaped rods 27 and 29 have their terminal ends 31 and 33 inserted within boreholes 23 and 25 with the ends being rotatable within the boreholes.

Plate members 35 and 37 which may be integral with L-shaped braces 39 and 41 extend substantially perpendicular from plate 15 and are mounted at either end of the plate by any well known means such as welding.

Plate members 35 and 37 terminate at their outer ends in inwardly extending fingers 43 and 45. The fingers include boreholes 47 and 49 respectively.

Four arm members 51, 53, 55, and 57 are pivotally attached to plate members 35 and 37 by means such as bolts and nuts 52. The arm members include boreholes at the outer ends thereof through which C-shaped rods 27 and 29 freely pass as shown.

Springs 59 and 61 are secured between fingers 49 and 47 and C-shaped rods 27 and 29, and bias each of the rods in a direction toward plates 35 and 47. Because of the location of the springs as to their position relative to plate members 35 and 37, the springs bias the cover 11 open when it is in its fully open position. This is so since the centerline of the spring passes beyond the pivot point of the arm at the plate and acts as an overcenter spring.

Figure 1:
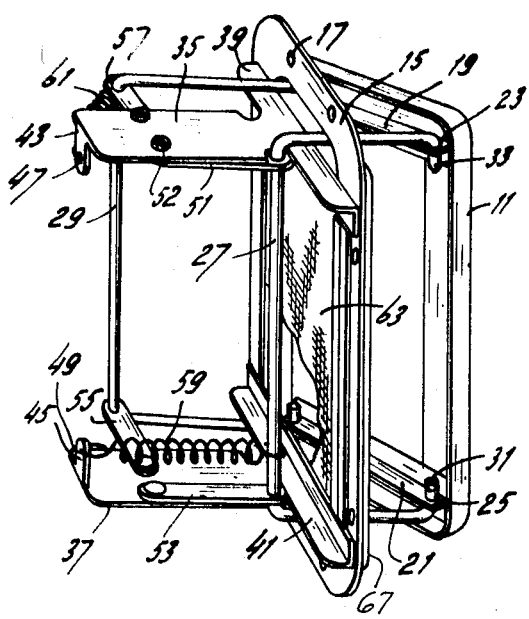
FIG. 1 is a perspective view of one embodiment of the ventilator of the present invention.
Figure 4:
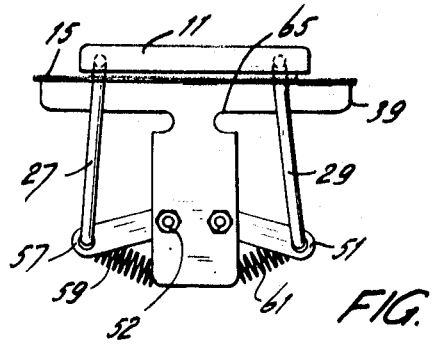
FIG. 4 is a top view of the ventilator in its closed position.
Figure 5:
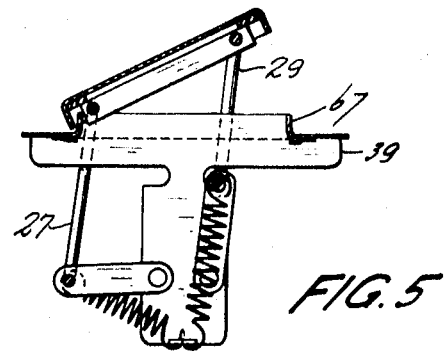
FIG. 5 is a top view of the ventilator in one of its open positions.
Figure 2:
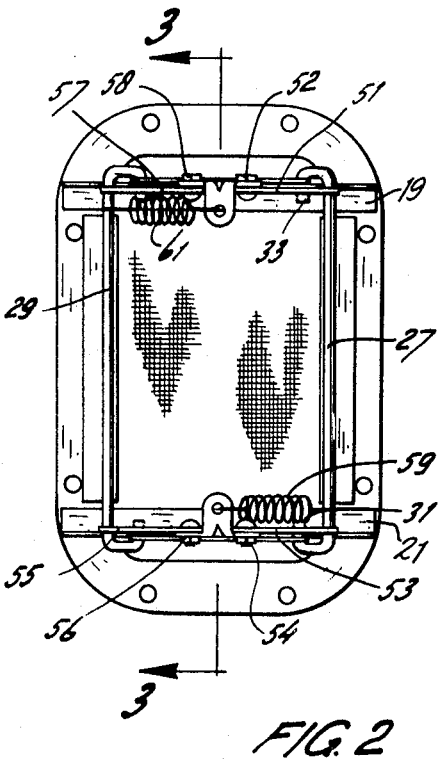
FIG. 2 is a plan view of the ventilator of FIG. 1.

FIGS. 4 and 5 illustrate the basic operation of the device. The cover is shown closed in FIG. 4 with springs 59 and 61 exerting a bias on the arm members to maintain it closed.

A manual pressure exerted against the center portion of C-shaped rod 29 forces one outer edge of cover 11 outwardly as shown in FIG. 5, while the other edge remains in contact with plate 15. When rod 29 extended to its maximum as determined by the length of the arm members, spring 61 has extended to its overcenter position relative to the pivot point on the plate member as described above. With the particular configuration shown, plate members 35 and 37 have notches 65 cut therein in order to allow for the full travel of the C-shaped rods. Obviously, the vent is opened in the opposite direction in the same manner with the manual pressure being exerted on rod 27.

Plate 15 is also illustrated with a rim 67 extending outwardly from the opening therein. This rim mates interiorly with rim 12 of cover 11. Insulation may be provided with the cover so that rim 67 will provide a substantially airtight seal when the cover is in its closed position. Additionally, a screen 63 may be provided across the opening for protective purposes when the cover is in the open position.

As can be seen, the present invention provides a ventilator for a vehicle compartment which is manually operable within the compartment and which will allow air to pass selectively into or out of the compartment.

It is to be understood that the above description and accompanying drawings are illustrative only and that various mechanical parts may be substituted in the device without departing from within the scope of the invention. Accordingly, the invention is to be limited only by the following claims.

I claim:

1. A ventilator capable of covering and uncovering an aperture in a wall to pass air in opposite directions therethrough, comprising first and second plate members mounted at either end of said aperture and extending substantially perpendicular thereto,
    a pair of arm members pivotally mounted to each of said plate members and extending outwardly of said plate members on opposite sides thereof,
    a cover on the opposite side of said aperture,
    a pair of C-shaped rods pivotally attached to said cover at opposite edges thereof, the center portion of said rods being substantially parallel to each other and perpendicular to said plate members,
    means for rotatably securing each of said C-shaped rods to the outer ends of opposed arm members on said first and second plate members, and
    spring means for biasing said C-shaped rods toward said first and second plate members.

2. The ventilator of claim 1 further comprising screen means mounted across said opening between said plate members.

3. A ventilator capable of covering and uncovering an aperture in a wall for passing air in opposite directions therethrough, comprising
    plate members mounted at either end of said aperture and extending inwardly from said wall,
    a cover adapted to fit over said aperture on the opposite side thereof from said plate members, C-shaped rods pivotally mounted on either side of said plate members with the terminal ends of said rods mounted to opposite edges of said cover, and
    spring means for biasing said C-shaped rods toward said plate members.

4. The ventilator of claim 3 wherein said spring means are tension springs and are connected to respective C-shaped rods so as to exert a force to maintain said cover open when said rod means is moved to its innermost position.

5. The ventilator of claim 3 further comprising screen means extending over said aperture between said plate members.

6. The ventilator of claim 3 additionally including arm members pivotally mounted on said plate members and rotatably connected to said C-shaped rods, and wherein said spring means are tension springs connected between respective C-shaped rods and plate members, the said spring means overcentering the pivot point of said arm members as the cover is actuated.

7. The ventilator of claim 6 additionally including recesses at the outer sides of said plate members for receiving the C-shaped rods when moved to their innermost open cover position.

* * * * *